United States Patent
Yu et al.

(10) Patent No.: US 12,056,329 B2
(45) Date of Patent: Aug. 6, 2024

(54) METHOD AND DEVICE FOR ADDING EMOJI, APPARATUS AND STORAGE MEDIUM

(71) Applicant: BEIJING ZITIAO NETWORK TECHNOLOGY CO., LTD., Beijing (CN)

(72) Inventors: Jie Yu, Beijing (CN); Kun Hai, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/882,487

(22) Filed: Aug. 5, 2022

(65) Prior Publication Data
US 2023/0016941 A1  Jan. 19, 2023

Related U.S. Application Data

(63) Continuation of application No. PCT/CN2022/104495, filed on Jul. 8, 2022.

(30) Foreign Application Priority Data

Jul. 15, 2021  (CN) .......................... 202110800478.2

(51) Int. Cl.
G06F 3/04817 (2022.01)
G06F 3/023 (2006.01)
G06F 3/14 (2006.01)

(52) U.S. Cl.
CPC ........ G06F 3/04817 (2013.01); G06F 3/0237 (2013.01); G06F 3/14 (2013.01)

(58) Field of Classification Search
CPC ...... G06F 3/04817; G06F 3/0237; G06F 3/14; G06F 3/0482; G06F 3/04886; G06F 3/1454; G06F 3/0236; H04L 51/10
See application file for complete search history.

(56) References Cited

U.S. PATENT DOCUMENTS

| 8,171,084 | B2 * | 5/2012 | Walter ................. H04L 51/04 709/204 |
| 2017/0147185 | A1 * | 5/2017 | Milvaney ............. G06F 40/169 |
| 2017/0220551 | A1 | 8/2017 | Zha |
| 2017/0286366 | A1 * | 10/2017 | Chang .................. G06F 40/103 |
| 2017/0336960 | A1 * | 11/2017 | Chaudhri ............... H04L 51/18 |
| 2018/0189628 | A1 * | 7/2018 | Kaufmann ............ G06N 3/006 |
| 2018/0314409 | A1 * | 11/2018 | Adilipour ............. H04L 51/10 |

(Continued)

FOREIGN PATENT DOCUMENTS

| CN | 101146056 A | 3/2008 |
| CN | 103905293 A | 7/2014 |

(Continued)

OTHER PUBLICATIONS

International Patent Application No. PCT/CN2022/104495; Int'l Search Report; dated Oct. 10, 2022; 3 pages.

(Continued)

*Primary Examiner* — James T Tsai
(74) *Attorney, Agent, or Firm* — BakerHostetler (57) ABSTRACT

A method and a device for adding an emoji, an apparatus and a storage medium are provided. When a second user replies to a target message with an emoji in a first session interface, the first user may trigger an emoji addition instruction for the emoji, and the emoji is added to an emoji input candidate box of the first user. With the method for adding the emoji according to embodiments, the emoji replied to the target message by the second user can be added to the emoji input candidate box of the first user, which can increase emojis in the emoji input candidate box of the first user, and meet the requirements of the first user sending various emojis.

20 Claims, 6 Drawing Sheets

(56) References Cited

U.S. PATENT DOCUMENTS

| | | | |
|---|---|---|---|
| 2018/0373683 A1 | 12/2018 | Hullette et al. | |
| 2019/0056841 A1* | 2/2019 | Fernandez | H04L 67/06 |
| 2020/0396187 A1* | 12/2020 | Woo | H04L 51/10 |
| 2021/0192800 A1* | 6/2021 | Dutta | G06F 40/205 |
| 2021/0314284 A1 | 10/2021 | Zhai | |
| 2021/0382590 A1* | 12/2021 | Fong | H04L 51/42 |
| 2021/0382610 A1* | 12/2021 | Prasad | G06F 3/04886 |
| 2022/0104105 A1* | 3/2022 | Raffa | H04W 48/04 |
| 2022/0129119 A1* | 4/2022 | Cole | G06F 3/04886 |

FOREIGN PATENT DOCUMENTS

| | | |
|---|---|---|
| CN | 107145270 A | 9/2017 |
| CN | 107483315 A | 12/2017 |
| CN | 109871165 A | 6/2019 |
| CN | 111756917 A | 10/2020 |
| CN | 114461102 A | 5/2022 |

OTHER PUBLICATIONS

"How to add emoticons sent by friends on WeChat"; https:/jingyan.baidu.com/article/bad08e1ed03bd509c8512120.html; Baidu; © 2023; accessed Feb. 6, 2023; 2 pages.

Liu, Yong; "How to Play QQ custom emoji"; PC Fan; No. 17; Dec. 2005; p. 16-17 (contains English Abstract).

"How to add emoticons sent by others to WeChat"; https://www.bkqs.com.cn/content/zpe59mqpy.html; Oct. 18, 2022; accessed Feb. 6, 2023; 11 pages.

\* cited by examiner

METHOD AND DEVICE FOR ADDING EMOJI, APPARATUS AND STORAGE MEDIUM

This application is a continuation of International Application No. PCT/CN2022/104495, filed on Jul. 8, 2022, which claims the priority to Chinese Patent Application No. 202110800478.2 titled "METHOD AND DEVICE FOR ADDING EMOJI, APPARATUS AND STORAGE MEDIUM", filed on Jul. 15, 2021, with the China National Intellectual Property Administration (CNIPA), both of which are incorporated herein by reference in their entireties.

FIELD

The present disclosure relates to the field of computers, and in particular to a method and a device for adding an emoji, an apparatus and a storage medium.

BACKGROUND

With the rapid development of Internet and related technology thereof, users may communicate through a variety of communication software. In the communication process, users express contents and emotions in the communication with emojis.

According to the conventional technology, emojis usable for the user are less, which cannot meet the requirements of the users sending various emojis.

SUMMARY

In order to meet the requirements of the users sending various emojis, a method and a device for adding an emoji, an apparatus and a storage medium are provided according to embodiments of the present disclosure.

A method for adding an emoji is provided according to an embodiment of the present disclosure. The method includes:

receiving an emoji addition instruction of a first emoji triggered by a first user in a first session interface, where the first emoji is an emoji replied by a second user to a target message in the first session interface; and adding the first emoji to an emoji input candidate box of the first user in response to the emoji addition instruction.

A device for adding an emoji is provided according to an embodiment of the present disclosure. The device includes a first receiving unit and an adding unit.

The first receiving unit is configured to receive an emoji addition instruction of a first emoji triggered by a first user in a first session interface, where the first session interface is an emoji replied by a second user to a target message in the first session interface.

The adding unit is configured to add the first emoji to an emoji input candidate box of the first user in response to the emoji addition instruction.

A processing apparatus is provided according to an embodiment of the present disclosure. The apparatus includes:

a memory storing an instruction; and a processor configured to execute the instruction in the memory, to perform the method according to the embodiments described above.

A computer-readable storage medium is provided according to an embodiment of the present disclosure. The computer-readable storage medium includes an instruction. The instruction, when executed by a computer, causes the computer to perform the method according to the embodiments described above.

With the method for adding an emoji according to the embodiments of the present disclosure, when a second user replies to a target message with an emoji in a first session interface, the first user may trigger an emoji addition instruction for the emoji, and the emoji is added to an emoji input candidate box of the first user. In this way, with the method for adding an emoji according to the embodiments of the present disclosure, the emoji replied to the target message by the second user can be added to the emoji input candidate box of the first user, which can increase emojis in the emoji input candidate box of the first user, and meet the requirement of the first user sending various emojis.

BRIEF DESCRIPTION OF THE DRAWINGS

In order to more clearly illustrate technical solutions in the embodiments of the present disclosure or in the conventional technology, the drawings to be used in the description of the embodiments or in the conventional technology are briefly described below. Apparently, the drawings in the following description show only some embodiments of the present disclosure, and other drawings may be obtained by those skilled in the art from the drawings without any creative work.

DETAILED DESCRIPTION

In order to understand the solutions of the present disclosure better by those skilled in the art, the technical solutions of embodiments of the present disclosure are clearly and completely described below in conjunction with the drawings of the embodiments of the present disclosure. Apparently, the embodiments described below are only some embodiments of the present disclosure, rather than all the embodiments. All the other embodiments obtained by those skilled in the art based on the embodiments in the present disclosure without any creative work fall within the protection scope of the present disclosure.

Figure 1:
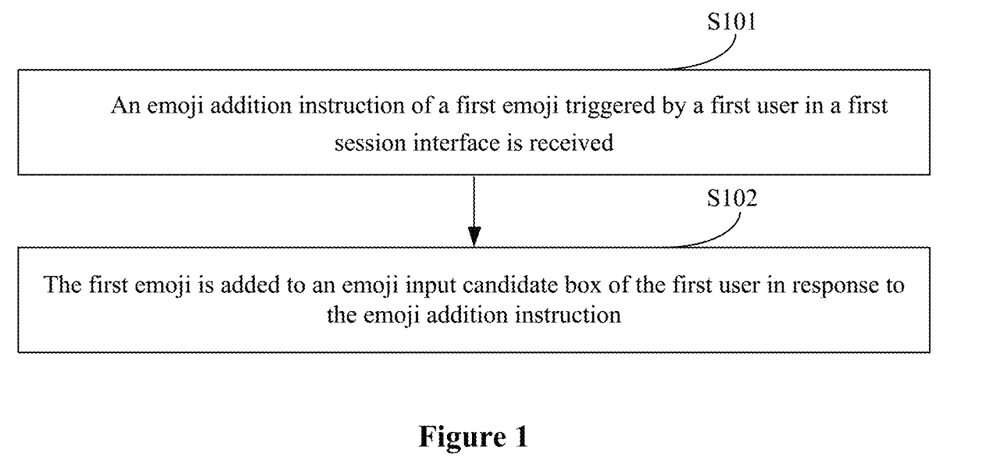
FIG. 1 is a flow chart of a method for adding an emoji according to an embodiment of the present disclosure.

Reference is made to FIG. 1, which is a flow chart of a method for adding an emoji according to an embodiment of the present disclosure.

The method for adding an emoji according to the embodiment of the present disclosure is applied to a client. Here, the client may be a terminal device. The terminal device may be a hardware device used for the communication, such as a mobile phone, a tablet computer or a personal computer (PC). The client may further be a software terminal for communication. The method for adding an emoji is introduced in the following embodiments by applying the method to the software terminal.

The method for adding an emoji according to the embodiment includes the following steps S101 and S102.

In step S101, an emoji addition instruction of a first emoji triggered by a first user in a first session interface is received.

In step S102, the first emoji is added to an emoji input candidate box of the first user in response to the emoji addition instruction.

In the embodiment of the present disclosure, the first user is a user who communicates in the first session interface of the client. The first session interface is an interface in which the first user communicates with a second user using voice or text through the client. The first session interface may be used to perform one-to-one communication only between the first user and the second user, that is, the first session interface is a private chat message interface. Alternatively, the first session interface may be used to perform communication for at least three users, and the first user and the second user are two of at least three users. That is, the first session interface may be a group chat message interface.

Figure 2:
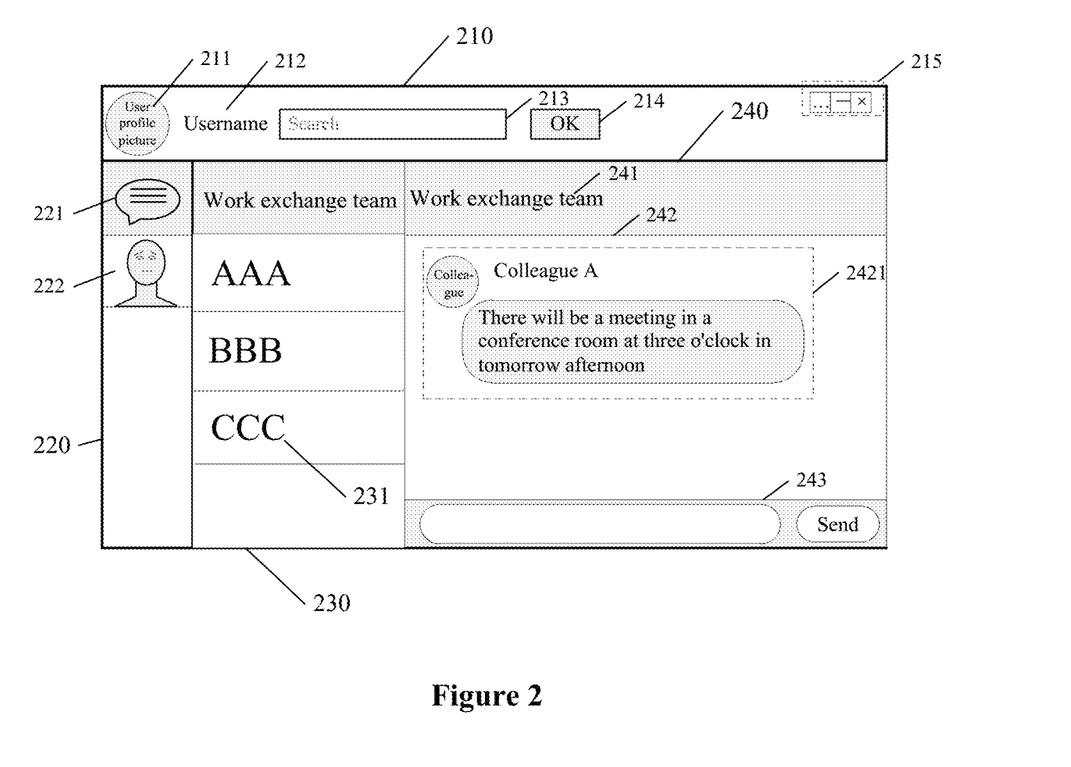
FIG. 2 is a schematic diagram of a display interface of a client according to an embodiment of the present disclosure.

Reference is made to FIG. 2, which is a schematic diagram of a display interface of a client according to an embodiment of the present disclosure. A display area of the client includes a basic information display area 210, a control display area 220, a session list display area 230, and a first session interface 240.

The basic information display area 210 may include a user profile picture display area 211, a username display area 212, a content search box 213, a search control 214, and an operation control set 215. The user profile picture display area 211 is used to display a profile picture of a user currently logged in to the client, which is set by the user. The username display area 212 is used to display a username or a nickname of the user currently logged in to the client. The content search box 213 is used to receive a keyword or other content inputted by the user. The search control 214 is used to trigger a search operation of the client. The operation control set 215 may include at least one operation control. The user may trigger operations, such as closing the client and minimizing the client by triggering the operation control in the operation control set.

At least one operation control is displayed in the control display area 220. The control display area 220 includes a message view control 221 and an address book view control 222. When the message view control 221 is triggered, the client displays a message notification, such as a group chat message notification or a private chat message notification, in the session list display area 230. As shown in FIG. 2, the message view control 221 is in a triggered state. When the address book view control 222 is triggered, the client displays an address book. As shown in FIG. 2, the address book view control 222 is in a non-triggered state.

The session list display area 230 includes one or more message notifications 231. The message notifications 231 include the group chat message notification and the private chat message notification. The private chat message notification is identified by a nickname of another user set by the first user, and the group chat message notification is identified by a group chat name. As shown in FIG. 2, the group chat message identified as a work exchange team is in the triggered state.

The first session interface 240 includes a title display area 241, a message content display area 242, and an input area 243. As shown in FIG. 2, the first session interface 240 is the group chat interface for displaying a group chat message. The title display area 241 may be used to display a group chat name corresponding to the group chat message. The message content display area 242 may be used to display at least one group chat message 2421, and may further be used to display relevant information of a sender of the group chat message. The input area 243 is used to receive a group chat message to be sent by the first user and send the group chat message.

Figure 3:
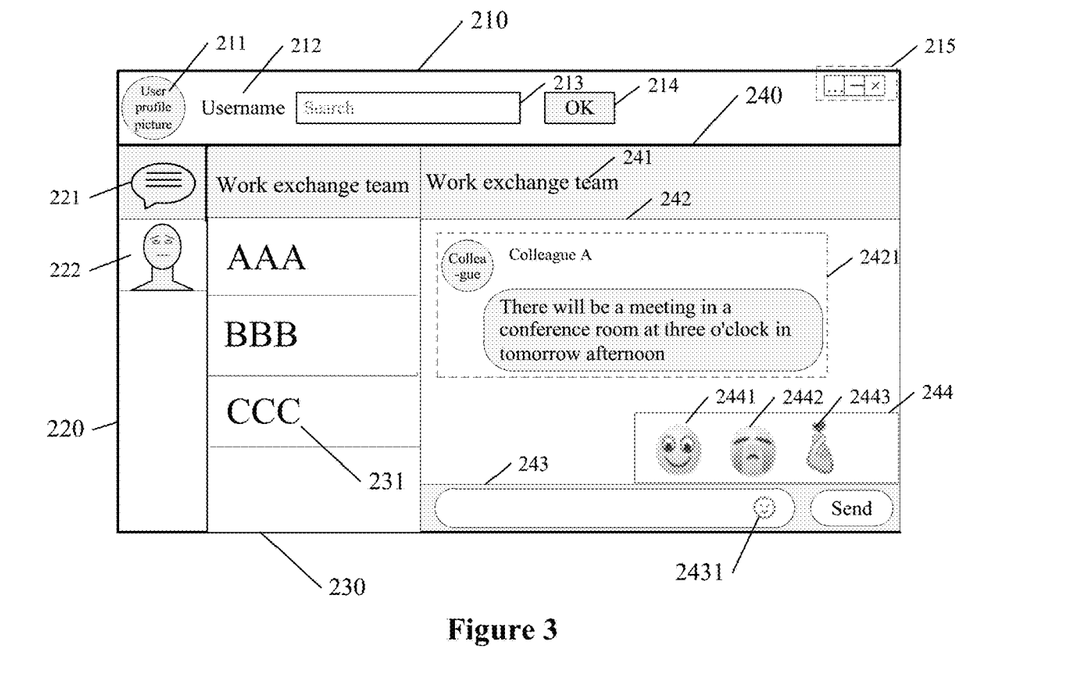
FIG. 3 is a schematic diagram of a display interface of a client according to another embodiment of the present disclosure.

As shown in FIG. 3, based on the first session interface 240 shown in FIG. 2, the input area 243 further includes an emoji input control 2431. In response to the first user triggering the emoji input control 2431, the emoji input candidate box 244 is displayed in an area where the first session interface 240 is located. The emoji input candidate box 244 includes one or more emojis. As shown in FIG. 3, the emoji input candidate box 244 includes a smiling emoji 2441, a crying emoji 2442, and a hand heart emoji 2443. In an initial state, the emoji input candidate box 244 includes emojis preset into the client, which is usable for the user.

The display interface and the first session interface of the client are introduced in detail by taking FIG. 2 and FIG. 3 as examples. It can be seen from FIG. 2 or FIG. 3 that in the first session interface, the first user may communicate with other users by sending text messages and emojis.

One or more users communicate in the first session interface 240 by sending messages. The first user may reply to a first message with an emoji. The emoji and the first message may be included in one message. The first message is replies by the emoji. The first message may be a text message, a voice message, or an emoji.

Figure 4:
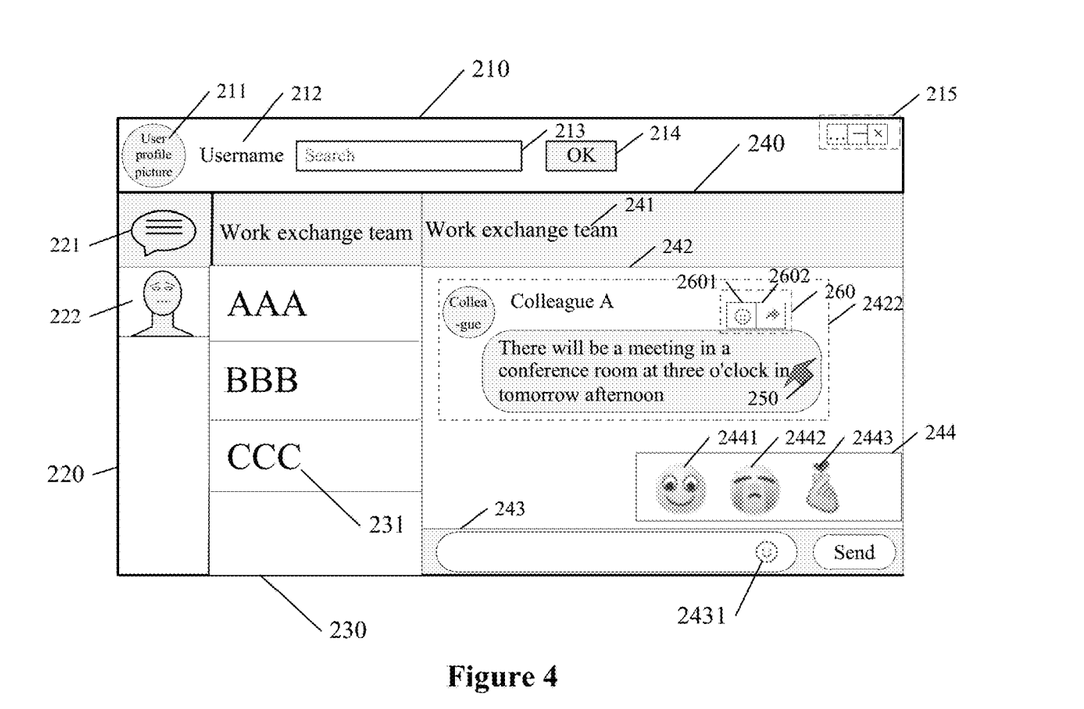
FIG. 4 is a schematic diagram of a display interface of a client according to another embodiment of the present disclosure.

In an embodiment, the client is communication software in the personal computer. As shown in FIG. 4, the first session interface shown in FIG. 4 is based on the first session interface in FIG. 2.

In response to another user sending a first message 2422, the first message 2422 is displayed in the message content display area 242 of the first session interface. In response to the first user moving a mouse control 250 to an area where the first message 2422 is located or the first user clicking on the area where the first message 2422 is located with the mouse control 250, the first session interface 240 displays a message operation control 260. The message operation control 260 includes an emoji input control 2601 and a message forwarding control 2602. The message forwarding control 2602 is used to forward the first message 2422, and the emoji input control 2601 is used to reply to the first message 2422 with an emoji.

Figure 5:
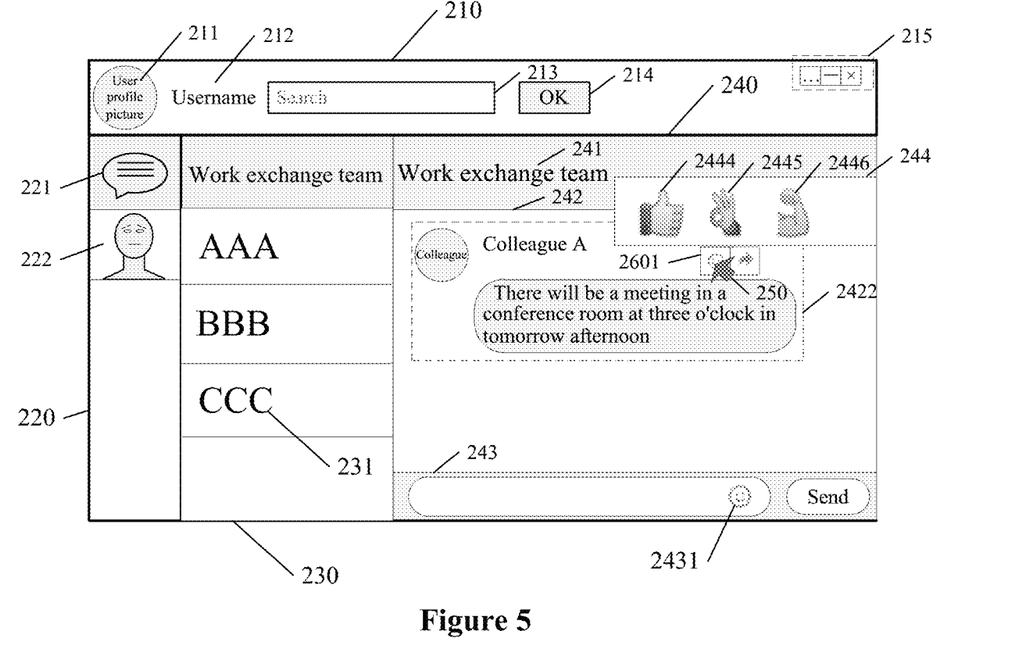
FIG. 5 is a schematic diagram of a display interface of a client according to another embodiment of the present disclosure.

As shown in FIG. 5, a first session interface shown in FIG. 5 is based on the first session interface in FIG. 4. In response to the first user moving the mouse control 250 to an area where the emoji input control 2601 is located or the first user clicking on the area where the emoji input control 2601 is located with the mouse control 250, the emoji input candidate box 244 is displayed in the area where the first session interface 240 is located. The emoji input candidate box 244 includes one or more emojis. As shown in FIG. 5, the emoji input candidate box 244 includes a like emoji 2444, an OK emoji 2445, and a fighting emoji 2446.

Figure 6:
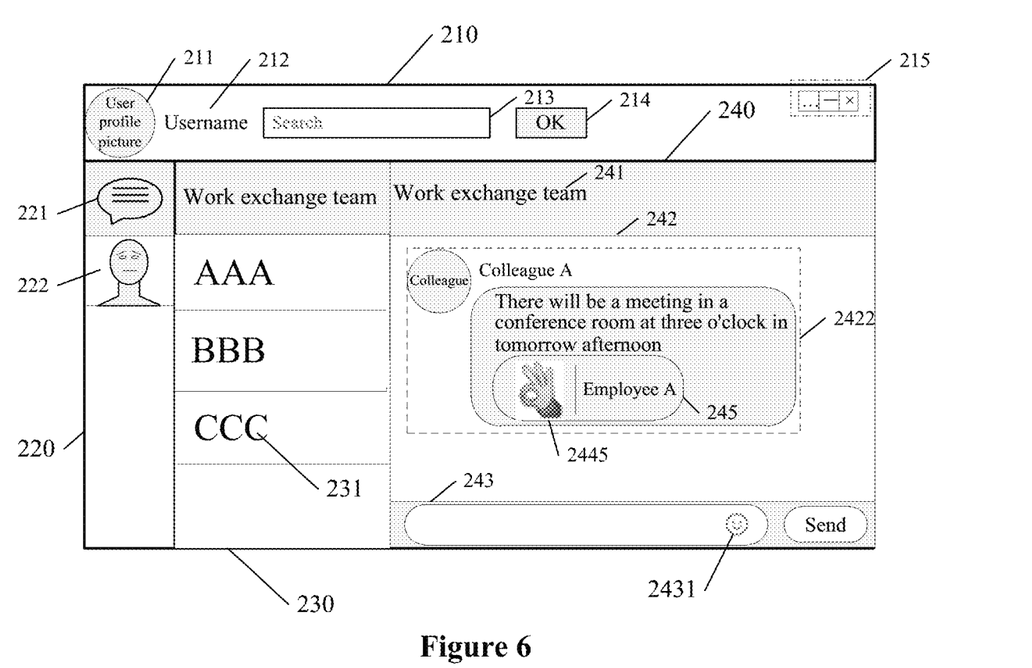
FIG. 6 is a schematic diagram of a display interface of a client according to another embodiment of the present disclosure.

As shown in FIG. 6, a first session interface shown in FIG. 6 is based on the first session interface in FIG. 5. The first user triggers an instruction for selecting the OK emoji 2445 in the emoji input candidate box 244. According to the instruction, the OK emoji 2445 is displayed in an emoji reply area 245 of the first session interface 240. The emoji reply area 245 is located in the area where the first message 2422 is located. The OK emoji 2445 shown in FIG. 6 and the first message 2422 are located in the same message, and the OK emoji 2445 may be located below a target message. The OK emoji 2445 is a reply of the first user to the first message 2422.

When the emoji with which the first user replies to the first message 2422 is displayed, a username or a nickname of the first user may further be displayed, so as to reflect that a user who replies to the first message with the emoji in the group chat message is the first user.

In an embodiment of the present disclosure, when the second user replies to the target message with the first emoji in the first session interface and the first emoji may be an emoji that is not in the emoji input candidate box of the first user, the first user may trigger the emoji addition instruction of the first emoji. The client may add the first emoji to the emoji input candidate box of the first user according to the emoji addition instruction. The step of the second user replying to the target message with the first emoji in the first session interface is similar to the step of the first user replying to the first message with the emoji in FIG. 6, which is not repeated herein. The target message is a message replied with the first emoji. The target message may be a text message, a voice message, or an emoji. The first emoji is an emoji replied by the second user to the target message in the first session interface.

In an embodiment of the present disclosure, the receiving the emoji addition instruction of the first emoji triggered by the first user in the first session interface specifically includes:

determining, in response to the first user clicking on the first emoji replied to the target message in the first session interface, that the emoji addition instruction of the first emoji triggered by the first user in the first session interface is received; or displaying, in response to the first user moving the mouse control to the area where the first emoji replied to the target message is located or in response to the first user clicking on the area where the first emoji replied to the target message is located, an emoji addition control in the area where the first session interface is located; and determining, in response to the first user clicking on the emoji addition control, that the emoji addition instruction of the first emoji triggered by the first user in the first session interface is received.

Figure 7:
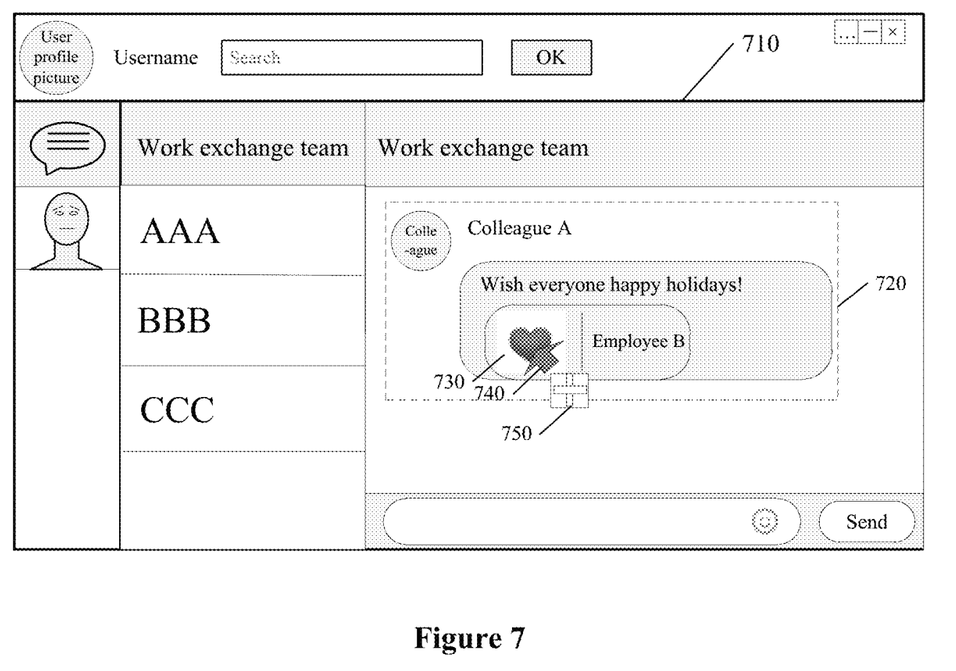
FIG. 7 is a schematic diagram of a display interface of a client according to another embodiment of the present disclosure.

In an embodiment, as shown in FIG. 7, in a first session interface 710 shown in FIG. 7, the second user replies to a target message 720 with a love emoji 730. The second user is an employee B shown in FIG. 7, and the love emoji 730 is the first emoji. In response to the first user moving the mouse control 740 to an area where the love emoji 730 replied to the target message 720 is located or in response to the first user clicking on the area where the love emoji 730 replied to the target message 720 is located with the mouse control 740, an emoji addition control 750 is displayed in an area where the first session interface 710 is located. When the first user clicks on the emoji addition control 750, the emoji addition instruction of the love emoji 730 replied to the target message 720 is triggered.

In another embodiment, as shown in FIG. 7, in the first session interface 710 shown in FIG. 7, the second user replies to the target message 720 with the love emoji 730. The second user is an employee B shown in FIG. 7, and the love emoji 730 is the first emoji. In response to the first user clicking on the love emoji 730 replied to the target message 720, the emoji addition instruction of the love emoji 730 replied to the target message 720 is triggered. In addition, when the first user clicks on the love emoji 730 replied to the target message 720, the first user may further reply to the target message 720 with the love emoji 730.

The client adds the first emoji replied to the target message to the emoji input candidate box of the first user, in response to the emoji addition instruction of the first emoji replied to the target message triggered by the first user.

Figure 8:
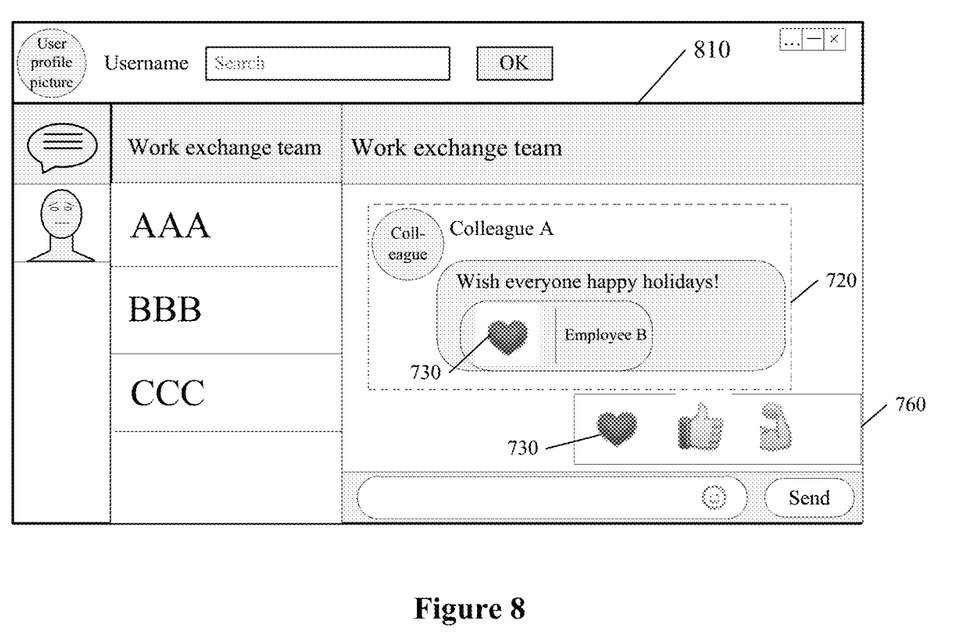
FIG. 8 is a schematic diagram of a display interface of a client according to another embodiment of the present disclosure.

As shown in FIG. 8, a first session interface shown in FIG. 8 is based on the first session interface in FIG. 7. In response to the first user triggering the emoji addition instruction of the love emoji 730 replied to the target message 720, the client adds the love emoji 730 to the emoji input candidate box 760 of the first user. As shown in FIG. 8, the emoji input candidate box 760 includes the newly added love emoji 730 replied to the target message 720.

In an embodiment of the present disclosure, when the first user triggers an instruction for displaying the emoji input candidate box in a second session interface, the emoji input candidate box is displayed in the second session interface. The instruction for displaying the emoji input candidate box may be triggered by the first user clicking on the emoji input control in the second session interface, to display the emoji input candidate box in the second session interface. The first emoji replied by the second user to a target image is displayed in the emoji input candidate box. In response to an instruction for selecting the first emoji triggered by the first user in the emoji input candidate box, the client sends the first emoji to the second session interface according to the instruction. The instruction for selecting the first emoji may be triggered by the first user clicking on the first emoji. The emoji input control may be a control for replying to a message sent by another user in the second session interface, or a control for sending a message in the input area. The second session interface may be the same as the first session interface. Alternatively, the second session interface is different from the first session interface.

Figure 9:
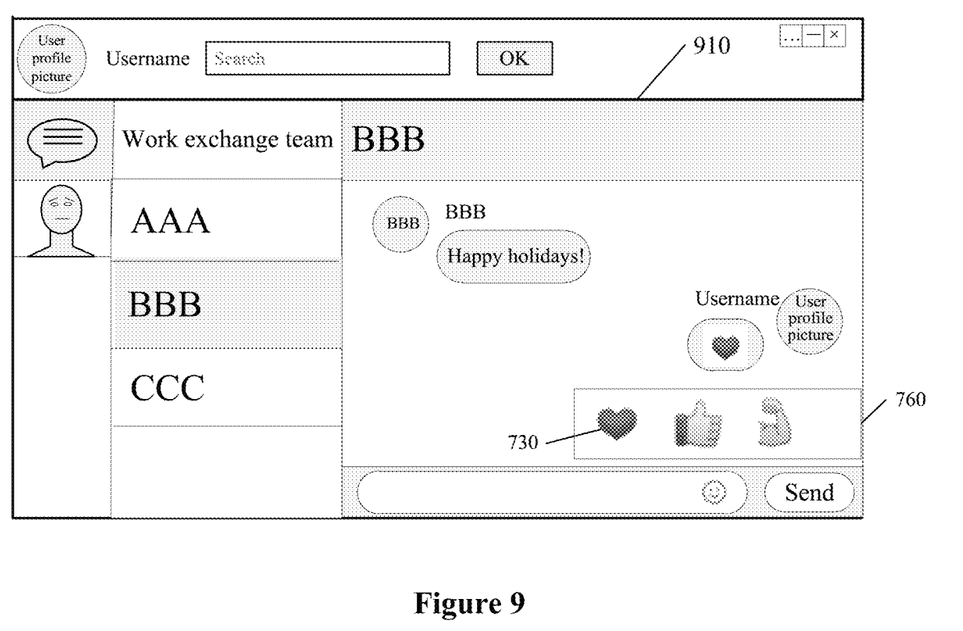
FIG. 9 is a schematic diagram of a display interface of a client according to another embodiment of the present disclosure.

After the client adds the love emoji 730 replied to the target message 720 in the first session interface 710 into the emoji input candidate box 760 of the first user, the emoji input candidate box 760 includes the newly added love emoji 730 replied to the target message 720. As shown in FIG. 9, a private chat message identified as BBB is in the triggered state. In a second session interface 910 of the private chat message identified as BBB, the first user communicates with a user BBB through one-to-one communication, that is, the second session interface 910 is a private chat message interface. The first user triggers the instruction for displaying the emoji input candidate box 760, and the emoji input candidate box is displayed in the second session interface 910. As shown in FIG. 9, the emoji input candidate box 760 includes the newly added love emoji 730. In response to an instruction for selecting the love emoji 730, the client sends the love emoji 730 to the second session interface 910 according to the instruction. The instruction is triggered by the first user clicking on an area where the love emoji 730 is located.

In the embodiment of the present disclosure, the emoji input candidate box includes a recently used emoji area. The recently used emoji area shows emojis frequently selected by the first user within a preset time period. When the first user adds the first emoji replied by the second user to the target message into the emoji input candidate box, the first emoji may be displayed in the recently used emoji area or in an entire emoji area.

Figure 10:
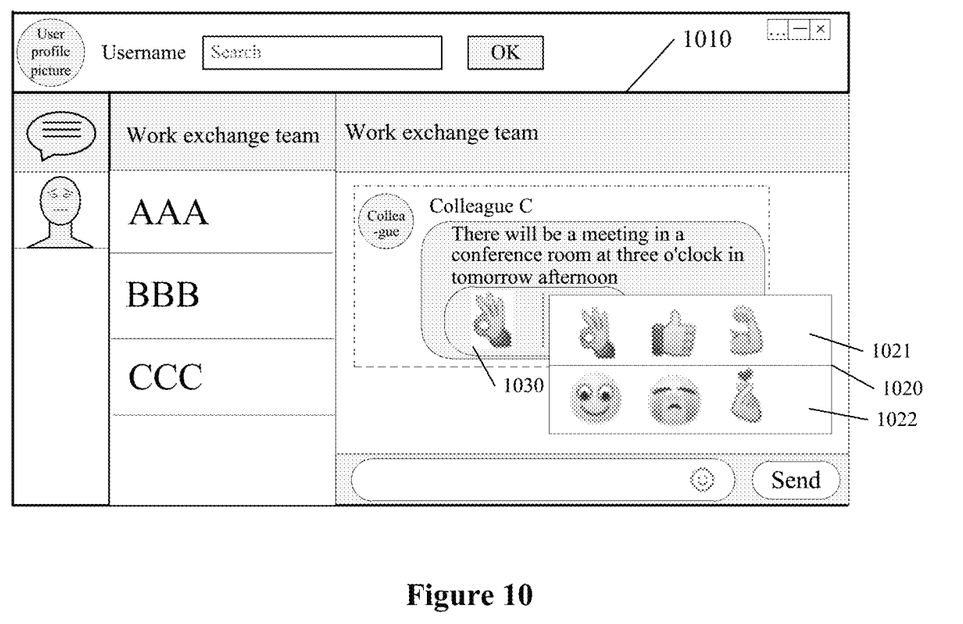
FIG. 10 is a schematic diagram of a display interface of a client according to another embodiment of the present disclosure.

As shown in FIG. 10, an emoji input candidate box 1020 is displayed in a first session interface 1010. The emoji input candidate box 1020 includes a recently used emoji area 1021 and an entire emoji area 1022. The first emoji 1030 replied by the second user to the target message is displayed in the recently used emoji area 1021, such that the user easily selects the newly added emoji.

In an embodiment of the present disclosure, the recently used emoji area may display the fixed number of emojis. That is, the number of the emojis in the recently used emoji area is fixed, and the emojis in the recently used emoji area are ranked in a recently used order of the emojis. For example, a last used emoji may be displayed at a head position. As a new emoji is added to the recently used emoji area, the emojis in the recently used emoji area may be changed, and an emoji originally displayed in the recently used emoji area may not be displayed in the recently used emoji area. That is, as the other recently used emojis are added to the recently used emoji area, the first emoji may be squeezed out of the recently used emoji area by the other recently used emojis, and the first emoji is not displayed in the recently used emoji area or the emoji input candidate box.

Since the number of the emojis in the recently used emoji area is fixed, the number of positions for displaying the emojis in the recently used emoji area is fixed. The recently used emoji area includes a head position and a tail position. When a new emoji is added to the recently used emoji area, the new emoji is displayed at the head position and the other emoji previously displayed at the tail position is not displayed in the recently used emoji area.

As an example, when a smile emoji is added in the recently used emoji area, the smile emoji is displayed at the head position. A fighting emoji originally displayed at the tail position is not displayed in the recently used emoji area.

In the embodiment of the present disclosure, before the first emoji is added to the emoji input candidate box of the first user, authentication may further be performed on the first user according to the emoji addition instruction triggered by the first user, to determine whether the first user has permission to add the first emoji. If an authentication result indicates that the first user has the permission to add the first emoji, the first emoji is allowed to be added to the emoji input candidate box of the first user, and the step of adding the first emoji to the emoji input candidate box of the first user is performed. If the authentication result indicates that the first user has no permission to add the first emoji, the first emoji is not allowed to be added to the emoji input candidate box of the first user. A condition for determining whether the first user has the permission to add the first emoji may include a department of the first user, gender of the first user and a time of the first user entering the department. The condition of permission determination is not limited in the embodiment of the present disclosure, and may be determined according to the actual situation. In a process of performing authentication on the first user, the client may directly perform authentication or a server may perform authentication and send the authentication result to the client.

In an embodiment of the present disclosure, before the first emoji is added to the emoji input candidate box of the first user, a target task may further be set for the first user. In response to the first user completing the target task, the emoji may be added to the emoji input candidate box of the first user. The target task is acquired by the client according to the emoji addition instruction triggered by the first user. The target task may include at least one of forwarding the target message and sharing a target link. The content of the target task is not limited in the embodiment of the present disclosure, and may be determined according to the actual situation. The target task may be automatically generated by the client according to the emoji addition instruction. Alternatively, the client sends, on receipt of the emoji addition instruction triggered by the first user, a request for requiring a target task to the server; and the server sends the target task to the client according to the request for requiring the target task.

In the embodiment of the present disclosure, the client adds the emoji to the emoji input candidate box of the first user according to the emoji addition instruction triggered by the first user in the following two ways.

In a first way, the client of the first user stores the first emoji replied by the second user to the target message, and the first emoji is not displayed in the emoji input candidate box of the first user. In such case, the client may acquire a first emoji identifier of the first emoji according to the emoji addition instruction triggered by the first user, directly acquire the first emoji from the client according to the first emoji identifier, and add the first emoji to the emoji input candidate box of the first user. The first emoji identifier is a unique identifier of the first emoji, and the first emoji may be uniquely determined based on the first emoji identifier.

In a second way, the client of the first user does not store the first emoji replied by the second user to the target message. In such case, the client is required to send an emoji acquisition request including the first emoji identifier to the server. The server determines the first emoji according to the first emoji identifier, and sends the first emoji to the client of the first user. The client adds, on receipt of the first emoji, the first emoji to the emoji input candidate box of the first user.

In an embodiment of the present disclosure, before sending the emoji acquisition request including the first emoji identifier to the server, the client first receives the first emoji identifier sent by the server. The client stores a correspondence between the first emoji and the first emoji identifier. In this way, in response to an emoji addition request from a user, the client determines the first emoji identifier according to the emoji addition request, and sends the emoji acquisition request including the first emoji identifier to the server.

In an embodiment of the present disclosure, the client may further receive an emoji text which is sent by the server according to the first emoji identifier. The client may store a correspondence among the first emoji identifier, the first emoji and the emoji text. The emoji text is a text that reflects meaning of the first emoji. For example, if the meaning reflected by the first emoji is smile, the emoji text thereof is smile. A language of the emoji text may be Chinese, English, Japanese, and the like, which will not be limited in the embodiment of the present disclosure.

In an embodiment of the present disclosure, the client may receive an emoji text inputted by the user in a text input box of the input area of the first session interface; and may display the first emoji corresponding to the emoji text in the first session interface according to the correspondence among the first emoji identifier, the first emoji and the emoji text.

As an example, if the emoji text inputted in the text input box of the input area of the first session interface is smile, the smile emoji corresponding to the smile is displayed in the first session interface.

In an embodiment of the present disclosure, a removing processing may be performed on the emoji. The client receives from the server, an emoji removing request with the first emoji identifier. The client deletes the first emoji from the emoji input candidate box according to the first emoji identifier to remove the emoji.

In an embodiment of the present disclosure, the client receives a second emoji identifier from the server, sends an emoji acquisition request including the second emoji identifier to the server, and receives a second emoji corresponding to the second emoji identifier. The second emoji identifier is a unique identifier of the second emoji, and the second emoji may be uniquely determined based on the second emoji identifier.

In an embodiment of the present disclosure, the server determines the second emoji according to the second emoji identifier in the emoji acquisition request, and sends the second emoji to the client.

In an embodiment of the present disclosure, the client adds the second emoji to the emoji input candidate box after receiving the second emoji corresponding to the second emoji identifier. The second emoji is displayed in the emoji input candidate box.

In an embodiment of the present disclosure, the client stores a correspondence between the second emoji and the second emoji identifier. In this way, in response to an emoji addition request from a user, the client determines the second emoji identifier according to the emoji addition request, and sends an emoji acquisition request including the second emoji identifier to the server.

In an embodiment of the present disclosure, the client may further receive an emoji text which is sent by the server according to the second emoji identifier. The client may store a correspondence among the second emoji identifier, the second emoji and the emoji text. The emoji text is a text that reflects meaning of the second emoji. For example, if the meaning reflected by the second emoji is smile, the emoji text is smile. A language of the text may be Chinese, English, Japanese, and the like, which will not be limited in the embodiment of the present disclosure.

In an embodiment of the present disclosure, the client may receive the emoji text inputted by the user in the text input box of the input area of the first session interface; and display a second emoji corresponding to the emoji text in the first session interface, according to the correspondence among the second emoji identifier, the second emoji and the emoji text.

In an embodiment of the present disclosure, the second emoji is acquired from the server according to the second emoji identifier, and resources of the emojis may be updated without relying only on a version update of the client. The emoji may be online, updated, modified and maintained at any time, so as to shorten an online cycle of the emoji and improve user experience for the emoji.

The method for adding the emoji according to the embodiments of the present disclosure is introduced in detail above. According to the method for adding the emoji according to the embodiments of the present disclosure, in a first session interface, a second user replies to a target message with a first emoji, the first user triggers an emoji addition instruction of the first emoji, and the first emoji is added to an emoji input candidate box of the first user. That is, according to the embodiments of the present disclosure, the first emoji replied by the second user to the target message is added to the emoji input candidate box of the first user, so as to meet the requirements of the first user sending various emojis.

Based on the method for adding the emoji according to the above embodiments, a device for adding an emoji is further provided according to an embodiment of the present disclosure.

Figure 11:
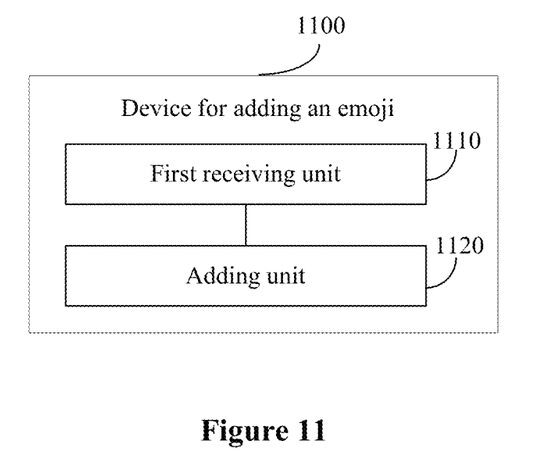
FIG. 11 is a structural block diagram of a device for adding an emoji according to an embodiment of the present disclosure.

Reference is made to FIG. 11, which is a structural block diagram of a device for adding an emoji according to an embodiment of the present disclosure.

A device 1100 for adding an emoji according to the embodiment includes a first receiving unit 1110 and an adding unit 1120.

The first receiving unit 1110 is configured to receive an emoji addition instruction of a first emoji triggered by a first user in a first session interface. The first emoji is an emoji replied by a second user to a target message in the first session interface.

The adding unit 1120 is configured to add the first emoji to an emoji input candidate box of the first user in response to the emoji addition instruction.

In an embodiment, the device further includes a second receiving unit and a first sending unit.

The second receiving unit is configured to receive an instruction for selecting the first emoji, wherein the instruction is triggered by the first user in an emoji input candidate box of a second session interface.

The first sending unit is configured to send the first emoji to the second session interface in response to the instruction.

In an embodiment, the emoji input candidate box includes a recently used emoji area, and the adding unit 1120 is specifically configured to: add the first emoji to the recently used emoji area of the first user in response to the emoji addition instruction.

In an embodiment, the recently used emoji area of the first user is capable of displaying a fixed number of emojis, and the emojis are ranked in a recently used order of the emojis.

The device further includes a squeezing unit. The squeezing-out unit is configured to make the first emoji be not displayed in the emoji input candidate box of the first user, in a case that the first emoji is squeezed out of the recently used emoji area by a recently used emoji.

In an embodiment, the device further includes an authentication unit. The authentication unit is configured to acquire an authentication result of determining whether the first user has permission to add the first emoji, according to the emoji addition instruction. The adding unit adds the first emoji to the emoji input candidate box of the first user, in response to the authentication result indicating that the first user has the permission.

In an embodiment, the device further includes an acquiring unit. The acquiring unit is configured to acquire a target task according to the emoji addition instruction. The adding unit adds the first emoji to the emoji input candidate box of the first user, in response to the first user completing the target task.

In an embodiment, the target task includes at least one of: forwarding the target message and sharing a target link.

In an embodiment, the adding unit is specifically configured to acquire a first emoji identifier of the first emoji according to the emoji addition instruction; acquire the first emoji according to the first emoji identifier; and add the first emoji to the emoji input candidate box of the first user.

In an embodiment, the adding unit is specifically configured to send an emoji acquisition request to a server, where the emoji acquisition request includes the first emoji identifier; and receive the first emoji which is sent by the server according to the first emoji identifier.

In an embodiment, the device further includes a first storage unit. The first storage unit is configured to store a correspondence between the first emoji and the first emoji identifier.

In an embodiment, the device further includes a third receiving unit and a second storage unit.

The third receiving unit is configured to receive an emoji text which is sent by the server according to the first emoji identifier.

The second storage unit is configured to store a correspondence among the first emoji identifier, the first emoji and the emoji text.

In an embodiment, the device further includes a fourth receiving unit and a display unit.

The fourth receiving unit is configured to receive the emoji text inputted by the user in a text input box.

The display unit is configured to display a first emoji corresponding to the emoji text according to the correspondence.

In an embodiment, the device further includes a fifth receiving unit and a deleting unit.

The fifth receiving unit is configured to receive from the server, an emoji removing request, where the emoji removing request includes the first emoji identifier.

The deleting unit is configured to delete the first emoji from the emoji input candidate box according to the first emoji identifier.

In an embodiment, the device further includes a sixth receiving unit, a second sending unit and a seventh receiving unit.

The sixth receiving unit is configured to receive a second emoji identifier sent by a server.

The second sending unit is configured to send an emoji acquisition request to the server, where the emoji acquisition request includes the second emoji identifier.

The seventh receiving unit is configured to receive a second emoji which is sent by the server according to the second emoji identifier.

In an embodiment, the first receiving unit is specifically configured to:

determine that the emoji addition instruction of the first emoji triggered by the first user in the first session interface is received, in response to the first user clicking on the first emoji replied to the target message in the first session interface; or display an emoji addition control in the area where the first session interface is located, in response to the first user moving the mouse control to the area where the first emoji replied to the target message is located or in response to the first user clicking on the area where the first emoji replied to the target message is located; and determine that the emoji addition instruction of the first emoji triggered by the first user in the first session interface is received, in response to the first user clicking on the emoji addition control.

Figure 12:
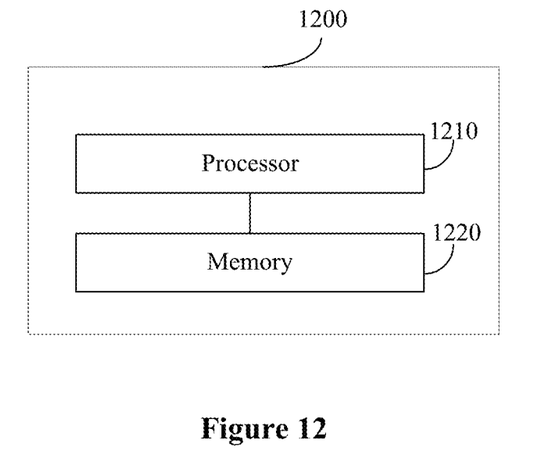
FIG. 12 is a structural block diagram of an apparatus for adding an emoji according to an embodiment of the present disclosure.

Based on the method for adding the emoji according to the above embodiments, an apparatus for adding an emoji is further provided according to an embodiment of the present disclosure. The apparatus 1200 for adding the emoji further includes a processor 1210 and a memory 1220. The number of the processor may be one or more. In some embodiments of the present disclosure, the processor is connected to the memory via a bus or in other way.

The memory may include a read-only memory and a random-access memory, and provide instructions and data for the processor. A part of the memory may further include NVRAM. The memory stores an operating system and operating instructions, an executable module or a data structure, a subset thereof, or an extended set thereof. The operating instructions may include various operating instructions for implementing various operations. The operating system may include various system programs for implementing various basic services and processing tasks based on hardware.

The processor controls operation of a terminal device, and may also be called as CPU.

The foregoing methods disclosed in the embodiments of the present disclosure may be applied to the processor, or may be implemented by the processor. The processor may be an integrated circuit chip with signal processing capabilities. In an implementation process, steps of the foregoing methods may be implemented through a hardware integrated logical circuit in the processor, or instructions in the form of software. The processor may be a general-purpose processor, DSP, ASIC, FPGA or other programmable logic devices, discrete gate or transistor logic devices, and discrete hardware components. The methods, steps, and logical block diagrams disclosed in the embodiments of the present disclosure may be implemented or performed. The general-purpose processor may be a microprocessor or any regular processor. In combination with the methods disclosed in the embodiments of the present disclosure, steps may be represented directly as being implemented by a hardware decoding processor, or implemented by a combination of hardware and software modules in a decoding processor. The software module may be located in a mature storage medium in the field, such as a random-access memory, a flash memory, a read-only memory, a programmable read-only memory, an electrically erasable programmable memory, or a register. The readable storage medium is located in the memory. The processor reads the information in the memory and completes the steps of the above method in combination with its hardware.

A computer-readable storage medium is further provided according to an embodiment of the present disclosure. The computer-readable storage medium is configured to store program codes, and the program codes are used to perform the method according to any one of the above embodiments.

When introducing the elements of the various embodiments of the present disclosure, the articles "a", "an", "this" and "the" are intended to represent one or more elements. The terms "include", "comprise", and "have" are all inclusive, and mean that there may be other elements in addition to the listed elements.

It should be illustrated that those skilled in the art can understand that all or part of the flows in the above method embodiments may be implemented through instructing related hardware by a computer program. The program may be stored in the computer-readable storage medium. When the program is executed, the program may perform the flows in the above method embodiments. The storage medium may be a magnetic disk, an optical disk, a read-only memory (ROM) or a random-access memory (RAM) or the like.

The embodiments of the present disclosure are described in a progressive manner, each embodiment focuses on differences from other embodiments, and the same or similar parts between the various embodiments may be referred to each other. Especially for the embodiments of the device, the corresponding descriptions are relatively simple because the embodiments of the device are similar to the embodiments of the method. The relevant parts may be referred to the description of the embodiments of the method. The above embodiments of the device are merely examples, where the units or modules described as separate components may be or may be not physically separated. Some or all of the units and modules may be selected to implement solutions in embodiments of the present disclosure. Those skilled in the art can understand and implement the present disclosure without any creative effort.

The above are only the specific embodiments of the present disclosure. It should be noted that those skilled in the art may make several improvements and modifications without departing from the principles of the embodiments of the present disclosure. These improvements and modifications should be considered to fall within the scope of protection of the embodiments of the present disclosure.

The invention claimed is:

1. A method for adding an emoji, comprising:
receiving an emoji addition instruction indicative of adding a first emoji to an emoji input candidate box of a first user, wherein the emoji addition instruction is triggered by the first user to add the first emoji to the emoji input candidate box of the first user, wherein the first emoji is an emoji used by a second user in response to a target message in a first session interface, wherein the second user who used the first emoji in response to the target message is different from the first user who triggers to add the first emoji to the emoji input candidate box, wherein the emoji input candidate box of the first user is specific to the first user and comprises emojis useable by the first user, and wherein the emoji input candidate box of the first user initially does not comprise the first emoji; and
adding the first emoji as a new emoji to the emoji input candidate box of the first user in response to the emoji addition instruction.

2. The method according to claim 1, further comprising:
receiving an instruction for selecting the first emoji, wherein the instruction is triggered by the first user in an emoji input candidate box of a second session interface; and
sending the first emoji to the second session interface in response to the instruction.

3. The method according to claim 1, wherein the emoji input candidate box comprises a recently used emoji area, and the adding the first emoji to an emoji input candidate box of the first user in response to the emoji addition instruction comprises:
adding the first emoji to the recently used emoji area of the first user, in response to the emoji addition instruction.

4. The method according to claim 3, wherein the recently used emoji area of the first user is capable of displaying a fixed number of emojis, the emojis are ranked in a recently used order of the emojis, and the method further comprises:
making the first emoji be not displayed in the emoji input candidate box of the first user, in a case that the first emoji is squeezed out of the recently used emoji area by a recently used emoji.

5. The method according to claim 1, wherein before the adding the first emoji to an emoji input candidate box of the first user, the method further comprises:
acquiring an authentication result of determining whether the first user has permission to add the first emoji, according to the emoji addition instruction; and
adding the first emoji to the emoji input candidate box of the first user, in response to the authentication result indicating that the first user has the permission.

6. The method according to claim 1, wherein before the adding the first emoji to an emoji input candidate box of the first user, the method further comprises:
acquiring a target task according to the emoji addition instruction; and
adding the first emoji to the emoji input candidate box of the first user, in response to the first user completing the target task.

7. The method according to claim 6, wherein the target task comprises at least one of: forwarding the target message and sharing a target link.

8. The method according to claim 1, wherein the adding the first emoji to an emoji input candidate box of the first user in response to the emoji addition instruction comprises
acquiring a first emoji identifier of the first emoji according to the emoji addition instruction;
acquiring the first emoji according to the first emoji identifier; and
adding the first emoji to the emoji input candidate box of the first user.

9. The method according to claim 8, wherein the acquiring the first emoji according to the first emoji identifier comprises:
sending an emoji acquisition request to a server, wherein the emoji acquisition request comprises the first emoji identifier;
receiving the first emoji which is sent by the server according to the first emoji identifier; and
storing a correspondence between the first emoji and the first emoji identifier.

10. The method according to claim 9, further comprising:
receiving an emoji text which sent by the server according to the first emoji identifier;
storing a correspondence among the first emoji identifier, the first emoji and the emoji text;
receiving the emoji text inputted by the user in a text input box; and
displaying a first emoji corresponding to the emoji text according to the correspondence.

11. The method according to claim 9, further comprising:
receiving from the server, an emoji removing request, wherein the emoji removing request comprises the first emoji identifier; and
deleting the first emoji from the emoji input candidate box according to the first emoji identifier.

12. The method according to claim 1, wherein the receiving an emoji addition instruction of a first emoji triggered by a first user in a first session interface comprises:
determining that the emoji addition instruction of the first emoji triggered by the first user in the first session interface is received, in response to the first user clicking on the first emoji replied to the target message in the first session interface; or
displaying an emoji addition control in an area where the first session interface is located, in response to the first user moving the mouse control to an area where the first emoji replied to the target message is located or in response to the first user clicking on the area where the first emoji replied to the target message is located; and
determining that the emoji addition instruction of the first emoji triggered by the first user in the first session interface is received, in response to the first user clicking on the emoji addition control.

13. A processing apparatus, comprising:
a memory storing an instruction; and
a processor configured to execute the instruction in the memory,
wherein the instruction, when executed by the processor, causes the processor to:
receive an emoji addition instruction indicative of adding a first emoji to an emoji input candidate box of a first user, wherein the emoji addition instruction is triggered by the first user to add the first emoji to the emoji input candidate box of the first user, wherein the first emoji is an emoji used by a second user in response to a target message in a first session interface, wherein the second user who used the first emoji in response to the target message is different from the first user who triggers to add the first emoji to the emoji input candidate box, wherein the emoji input candidate box of the first user is specific to the first user and comprises emojis useable by the first user, and wherein the emoji input candidate box of the first user initially does not comprise the first emoji; and
add the first emoji as a new emoji to the emoji input candidate box of the first user in response the emoji addition instruction.

14. The processing apparatus according to claim 13, wherein the instruction, when executed by the processor, causes the processor to:
receive an instruction for selecting the first emoji, wherein the instruction is triggered by the first user in an emoji input candidate box of a second session interface; and
send the first emoji to the second session interface in response to the instruction.

15. The processing apparatus according to claim 13, wherein the emoji input candidate box comprises a recently used emoji area, and
the instruction, when executed by the processor, causes the processor to:
add the first emoji to the recently used emoji area of the first user, in response to the emoji addition instruction.

16. The processing apparatus according to claim 15, wherein the recently used emoji area of the first user is capable of displaying a fixed number of emojis, the emojis are ranked in a recently used order of the emojis, and
the instruction, when executed by the processor, causes the processor to:
make the first emoji be not displayed in the emoji input candidate box of the first user, in a case that the first emoji is squeezed out of the recently used emoji area by a recently used emoji.

17. The processing apparatus according to claim 13, wherein the instruction, when executed by the processor, causes the processor to:
acquire an authentication result of determining whether the first user has permission to add the first emoji, according to the emoji addition instruction; and
add the first emoji to the emoji input candidate box of the first user, in response to the authentication result indicating that the first user has the permission.

18. The processing apparatus according to claim 13, wherein the instruction, when executed by the processor, causes the processor to:
acquire a first emoji identifier of the first emoji according to the emoji addition instruction;
acquire the first emoji according to the first emoji identifier; and
add the first emoji to the emoji input candidate box of the first user,
wherein the instruction, when executed by the processor, causes the processor further to:
send an emoji acquisition request to a server, wherein the emoji acquisition request comprises the first emoji identifier;
receive the first emoji which is sent by the server according to the first emoji identifier; and
store a correspondence between the first emoji and the first emoji identifier.

19. The processing apparatus according to claim 18, wherein the instruction, when executed by the processor, causes the processor to:
receive an emoji text which sent by the server according to the first emoji identifier;
store a correspondence among the first emoji identifier, the first emoji and the emoji text;
receive the emoji text inputted by the user in a text input box; and
display a first emoji corresponding to the emoji text according to the correspondence.

20. A non-transitory computer-readable storage medium, comprising an instruction, wherein the instruction, when executed by a computer, causes the computer to:
receive an emoji addition instruction indicative of adding a first emoji to an emoji input candidate box of a first user, wherein the emoji addition instruction is triggered by the first user to add the first emoji to the emoji input candidate box of the first user, wherein the first emoji is an emoji used by a second user in response to a target message in a first session interface, wherein the second user who used the first emoji in response to the target message is different from the first user who triggers to add the first emoji to the emoji input candidate box, wherein the emoji input candidate box of the first user is specific to the first user and comprises emojis useable by the first user, and wherein the emoji input candidate box of the first user initially does not comprise the first emoji; and
add the first emoji as a new emoji to the emoji input candidate box of the first user in response the emoji addition instruction.

* * * * *